Patented Feb. 21, 1950

2,497,955

UNITED STATES PATENT OFFICE 2,497,955

IMINOESTER RESINS

Warren D. Niederhauser, Philadelphia, and Herman A. Bruson, Rydal, Pa., assignors, by mesne assignments, to Rohm & Haas Company, Philadelphia, Pa., a corporation of Delaware No Drawing. Application February 21, 1946, Serial No. 649,392

2 Claims. (Cl. 260—72)

This invention concerns novel resins prepared by reacting together three components, a polyhydric alcohol, an aldehydo-monocarboxylic acid, and a di-primary amine. In place of a free monocarboxylic acid, there may be used an ester thereof formed with a volatile alcohol.

The resins of this invention are prepared by heating a polyhydric alcohol with an aldehydo-monocarboxylic acid (or an ester thereof) to form a polyester and heating this polyester with a di-primary amine to form a resinous product.

For best results, at least two mols of aldehydo-monocarboxylic acid are reacted with one mol of polyhydric alcohol. This minimum proportion of acid to alcohol is sufficient to form at least a di-acid ester. With trihydric, tetrahydric, or hexahydric alcohols up to three, four, or six mols respectively of acids may be reacted per mol of a said alcohol. Excess alcohol, if used, merely remains in the reaction mixture whereas, when alcohol is used in an amount insufficient to react with all of the acid, the free acid groups may be readily reacted with an excess of amine.

At least one mol of a di-primary amine is used per mol of polyhydric alcohol and as many mols of such amine may be used as there are mols of aldehydo-monocarboxylic acid in the reaction mixture. Thus, when six mols of aldehydo-carboxylic acid are taken, six mols of said amine may be used. While it is desirable to react alcohol, acid, and amine in approximately balanced stoichiometric proportions, satisfactory resins for many applications are nevertheless obtained when excess is taken of alcohol or amine. When the proportion of polyhydric alcohol to amine is one to one, the primary condensates formed are essentially linear in character, and solubility and fusibility are retained even in the case of trifunctional or higher functional alcohols with or without equivalent proportions of aldehydo-acid. With alcohols of functionality greater than two used with more than two mols of aldehydo-acid per mol of such alcohol, the primary condensates with excess amine are fusible but may become thermoset on further heating.

As aldehydo-monocarboxylic acids, there may be used any such acid in which the aldehyde group and acid carboxyl group are separated by at least two carbon atoms. In the preferred form of this invention, the carbon atoms separating these two functional groups are members of an aliphatic group or chain, although it is not necessary that the compound be purely aliphatic. While it may be such, it may also be a mixed aliphatic compound, including aryl-aliphatic and alicyclicaliphatic.

The aliphatic aldehydo-monocarboxylic acids of the formula $OHC-C_nH_{2n}-COOH$ and their simple esters, wherein $C_nH_{2n}$ is an alkylene group, straight or branched, of at least two carbon atoms in length and $n$ is an integer having a value of at least two, commonly varying from two to sixteen, are of particular interest. Typical of the acids summarized by the formula

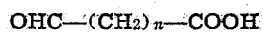
$$OHC-(CH_2)_n-COOH$$

are omega-aldehydo-propionic acid, omega-aldehydo-butyric acid, omega-aldehydo-valeric acid, and omega-aldehydo-octoic acid.

Branched chained acids of the formula

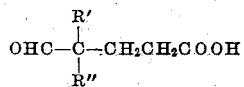
$$OHC-\underset{R''}{\overset{R'}{\underset{|}{\overset{|}{C}}}}-CH_2CH_2COOH$$

wherein R' is hydrogen or an alkyl group and R'' is an aliphatic hydrocarbon group, form another class of importance. The group R'' may be saturated or unsaturated. Typical of these acids are β-carboxyethyl diethyl acetaldehyde

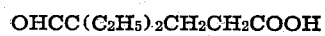
$$OHCC(C_2H_5)_2CH_2CH_2COOH$$

β-carboxyethyl ethyl butyl acetaldehyde

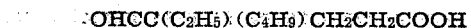
$$OHCC(C_2H_5)(C_4H_9)CH_2CH_2COOH$$

β-carboxyethyl ethyl butenyl-1 acetaldehyde

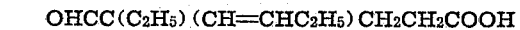
$$OHCC(C_2H_5)(CH=CHC_2H_5)CH_2CH_2COOH$$

or β-carboxyethyl dimethyl acetaldehyde

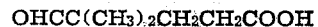
$$OHCC(CH_3)_2CH_2CH_2COOH$$

and homologues thereof, including those described in United States Patent No. 2,342,607, issued February 22, 1944. In the above-named compounds R' is an alkyl group of one to two carbon atoms and R'' is an aliphatic hydrocarbon group of one to four carbon atoms.

Another useful sub-group of aldehydo-carboxylic acids and their esters which meet the requirements of this invention is comprised of alicyclicaliphatic compounds such as are formed by the addition of acrolein or crotonaldehyde to aliphatic carboxylic acids or esters having a conjugate diolefinic linkage, as in eleostearic or licanic acids. Aldehydo-monocarboxylic acids and esters of this type are described in application Serial No. 623,442, filed October 19, 1945 now abandoned. Resins based on acids of this type are characterized generally by being softer and soluble in a greater variety of solvents than resins based on other types of acids. The resins from the alicyclicaliphatic acids are particularly useful as non-volatile non-migrating softeners for other resinous materials.

As has been indicated, there may be used esters instead of the free acids. Esters of the lower aliphatic alcohols are particularly suitable, as these alcohol groups can readily be replaced by transesterification with a polyhydric alcohol. Esters of methyl, ethyl, propyl, and butyl alcohol are particularly susceptible to replacement in this way, yet esters through hexyl up to octyl or 2- ethyl hexyl may be used with the same end effect.

As polyhydric alcohols, there may be used the glycols and aliphatic alcohols of higher functionality, including glycerine, pentaerythritol, dipentaerythritol, mannitol, sorbitol, methyl glycerol, phenyl glycerol, diethylene glycol, dipropylene glycol, triethylene glycol, propylene glycol, ethylene glycol, trimethylene glycol, and the like. There may also be used cycloaliphatic alcohols such as the cyclohexyl diols or triols or inositol.

For this invention, there are required diprimary amines, the amine groups of which are separated by a chain of at least four atoms as, for example, occurs in tetramethylenediamine, pentamethylenediamine, hexamethylenediamine, and decamethylenediamine, or isomers, or homologues thereof. These di-primary amines, which form a group of considerable importance, may be represented by the formula $NH_2$—$C_nH_{2n}$—$NH_2$, wherein $C_nH_{2n}$ is an alkylene chain of at least four carbon atoms and $n$ is an integer of at least four, usually varying from four to ten.

Related to these diamines are arylaliphatic and dicyclicaliphatic diamines such as $$NH_2C_6H_4(CH_2)_nNH_2$$

where $n$ is a small integer,

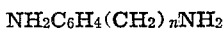
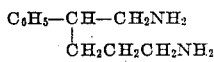

or

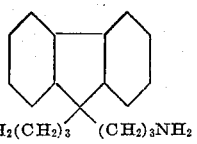

or 1,4-diaminocyclohexane and its homologues, or such amines as:

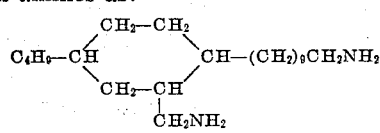

Aromatic diamines form another important sub-class, typical of which are $NH_2C_6H_4NH_2$ and $NH_2C_6H_4\cdot C_6H_4NH_2$. In these compounds as in all of the amines described or named above it is, of course, necessary that the amine groups be separated by at least four carbon atoms. As shown by the above illustrations, as many as thirteen carbon atoms may separate the two amino groups.

The chain of atoms separating the two primary amine groups need not be exclusively carbon atoms but may contain a heteroatom, such as oxygen, sulfur, or nitrogen. Typical of such compounds are diaminoethyl ether, diaminoethyl thioether, diethylenetriamine, dipropylenetriamine, triethylenetetramine, N,N'-diaminopropyldiaminoethane, and the like.

The reaction appears to proceed according to the following steps, the simplest case being shown for purposes of illustration:

OHCRCOOH+HO—R'—OH→
  OHCRCOOR'OOCRCHO
OHCRCOOR'OOCRCHO+$NH_2$—R''—$NH_2$→
  OHCRCOOR'OOCRCH=NR''$NH_2$→
OHCCRCOOR'OOCRCH—
  (=CRCOOR'OOCRCH=NR''N=)$_x$—R''$NH_2$

The particular terminal groups will, of course, vary with the proportions and method of reaction.

In effecting the reaction, it is generally preferred to effect esterification of polyhydric alcohol with aldehydo-monocarboxylic acid. This may be accomplished by heating together these components without or with a catalyst, such as zinc chloride, sulfuric acid, phosphoric acid, or other acidic catalyst. The water of esterification may be driven off with heat or removed azeotropically with a solvent, such as benzene, toluene, naphthalene, ethylene dichloride, etc. An inert gas, such as hydrogen or nitrogen, may be passed through the reaction mixture to prevent deterioration by oxidation and to help carry away the volatile products formed.

If an ester of the aldehydo-acid is used, the volatile product is the alcohol displaced by the polyhydric alcohol. In some cases, such transesterification is desirable, particularly because it permits the use of an alkaline catalyst, such as sodium methylate, in place of an acidic catalyst. Esterification and removal of volatile products, including any solvent which may have been used at the start, may be effected at temperatures of 80° C. to over 200° C. and reduced pressure may be applied to assist in completing the reaction.

A di-primary amine may be added to the ester of polyhydric alcohol and aldehydo-acid and the resulting mixture heated at 150° to 300° C. Again, volatile products are removed. An inert gas may be passed through the reacting mixture and/or vacuum may be applied.

The products vary from viscous syrups and balsams to hard, flexible resins. They are useful as resinous softeners, tackifiers, or plasticizers for other resins, particularly resins of the nylon type. Some products are useful in coating compositions and hot-melt coatings or for forming films.

Typical examples of the preparation of the resins of this invention follow.

*Example 1*

A mixture of 8.44 parts of the product formed by esterifying one mol of ethylene glycol with two mols of 2-(β-carboxyethyl)-2-ethylhexen-3-al, and 3.44 parts of decamethylenediamine was heated for thirteen hours at 210° C. while a slow stream of nitrogen was passed through the melt. The system was evacuated and the resin was heated an additional hour at 210° C. at 4 mm. pressure. The resulting resin was a thick amber syrup, readily soluble in cold alcohol, benzene, or ethylene dichloride, but insoluble in hot petroleum ether. Flowouts of the resin from butanol solution containing cobalt drier dried at 110° C. to hard, flexible, tack-free films.

*Example 2*

A mixture of 9.40 parts of the product formed by esterifying one mol of diethylene glycol with two mols of 2-(β-carboxyethyl)-2-ethylhexaldehyde and 3.44 parts of decamethylenediamine was heated for thirteen hours at 210° C. while a slow stream of nitrogen was passed through the melt. The reaction vessel was evacuated and heated one more hour at 210° C. at 4 mm. pressure. The product was an amber, tacky resin, soluble in alcohol, benzene, and ethylene dichloride, but insoluble in petroleum ether.

*Example 3*

A mixture of 7.40 parts of the product prepared by esterifying one mol of ethylene glycol with two mols of 2-(β-carboxyethyl)-2-ethylbutyraldehyde and 3.44 parts of decamethylenediamine was gradually warmed to 214° C. over a period of four hours while a slow stream of nitrogen was passed through the melt. The product was heated two more hours at 214° C. under 1 mm. pressure. The resulting resin was a thick red syrup, readily soluble in butanol.

*Example 4*

A mixture of 9.40 parts of the product obtained by esterifying one mol of diethylene glycol with two mols of 2-($\beta$-carboxyethyl)-2-ethylhexaldehyde and 2.32 parts of hexamethylenediamine was heated for one hour at 100° C., for one hour at 210°–220° C., and for two and one-half hours at 210°–220° C. at the reduced pressure of 3 mm. while a slow stream of nitrogen was passed through the melt. The product was a tacky, fusible, orange resin.

*Example 5*

A mixture of 9.40 parts of the product obtained by esterfying one mol of diethylene glycol with two mols of 2-($\beta$-carboxyethyl)-2-ethylhexaldehyde and 1.03 parts of diethylenetriamine was subjected to the same heat treatment given in Example 4. The product was a reddish-brown syrup of much lower viscosity than the resin mentioned in Example 4.

*Example 6*

A mixture of 10.76 parts of the product prepared by esterifying one mol of decamethylene glycol with two mols of 2-($\beta$-carboxyethyl)-2-ethylhexaldehyde and 3.44 parts of decamethylenediamine was heated in a slow stream of nitrogen for one hour at 100°–105° C., for 1.3 hours at 190°–205° C., and finally for two hours at 205°–215° C. under 3 mm. pressure. The product was a tacky, fusible resin.

*Example 7*

A mixture of 12.96 parts of the product obtained by esterifying one mol of glycerol with three mols of 2-($\beta$-carboxyethyl)-2-ethylhexaldehyde and 5.16 parts of decamethylenediamine was heated in a slow stream of nitrogen for 1.25 hours at 100°–110° C., for 1.3 hours at 200°–215° C., and then for two hours at 210°–215° C. under 3 mm. pressure. The product at this stage was a tough, fusible, balsam-like resin.

*Example 8*

A mixture of 8.64 parts of the product obtained by esterifying one mol of pentaerythritol with four mols of 2-($\beta$-carboxyethyl)-2-ethylhexaldehyde and 3.44 parts of decamethylenediamine was heated in a slow stream of nitrogen for one hour at 120°–160° C., for one-half hour at 200°–210° C., and finally for two hours at 205°–215° C. under 4 mm. pressure. The product was a tough, brown, fusible resin.

*Example 9*

A mixture of 7.34 parts of the product obtained by esterifying one mol of mannitol with three mols of 2-($\beta$-carboxyethyl)-2-ethylhexaldehyde and 2.58 parts of decamethylenediamine was heated in a slow stream of nitrogen for one hour at 140°–190° C., for one-half hour at 210°–215° C., and for two hours at 212°–217° C. at 4 mm. pressure. The product was red fusible resin which could be drawn into elastic tack-free fibers.

*Example 10*

A mixture of 7.34 parts of the product obtained by esterifying one mol of sorbitol with three mols of 2-($\beta$-carboxyethyl)-2-ethylhexaldehyde and 2.58 parts of decamethylene diamine was heated for one and one-half hours at 130°–220° C. and then for two hours at 211°–215° C. under 4 mm. pressure. The product was a tough, reddish, balsam-like resin.

*Example 11*

A mixture of 5.46 parts of the product obtained by esterifying one mol of mannitol with two mols of 2-($\beta$-carboxyethyl)-2-ethylhexaldehyde and 1.72 parts of decamethylenediamine was heated in a slow stream of nitrogen for one hour at 100°–200° C. and for two hours at 210°–215° C. under 3 mm. pressure. The product was a tacky red-brown resin which could be drawn into elastic fibers.

*Example 12*

A mixture of 6.73 parts of the product obtained by esterfying one mol of dipentaerythritol with six mols of 2-($\beta$-carboxyethyl)-2-ethylhexaldehyde and 2.58 parts of decamethylenediamine was heated in a slow stream of nitrogen for 1.3 hours at 95°–107° C., for one hour at 195°–215° C., and for two hours at 210°–215° C. at 4 mm. pressure. The product was an orange-red fusible resin.

*Example 13*

A mixture of 6.18 parts of the product obtained by esterfying one mol of dipentaerythritol with two mols of 2-($\beta$-carboxyethyl)-2-ethylhexaldehyde and 1.72 parts of decamethylenediamine was heated for one hour at 200°–207° C. and for two and one-quarter hours at 209°–212° C. at 4 mm. pressure. The product was a fusible resin.

We claim:

1. The process of preparing resinous materials which comprises condensing together two molar proportions of glycerol, three molar proportions of decamethylene diamine, and six molar proportions of 2-(beta-carboxyethyl)-2-ethylhexaldehyde in successive steps consisting of condensing the glycerol with the 2-(beta-carboxyethyl)-2-ethylhexaldehyde at a temperature between 80° C. and 200° C. and reacting the resulting condensate with said diamine by heating them together at 150° C. to 300° C.

2. The product obtained by the process of claim 1.

WARREN D. NIEDERHAUSER.
HERMAN A. BRUSON.

REFERENCES CITED

The following references are of record in the file of this patent:

UNITED STATES PATENTS

| Number | Name | Date |
|---|---|---|
| 2,197,357 | Widmer et al. | Apr. 16, 1940 |
| 2,310,943 | Dorough et al. | Feb. 16, 1943 |
| 2,342,607 | Bruson et al. | Feb. 22, 1944 |

OTHER REFERENCES

Ser. No. 382,947, Hans Bergk (A. P. C.), published April 20, 1943.